(12) United States Patent
Lameter

(10) Patent No.: US 7,716,513 B2
(45) Date of Patent: May 11, 2010

(54) SELF-TUNING TIME INTERPOLATOR

(75) Inventor: Christoph Lameter, Newark, CA (US)

(73) Assignee: Graphics Properties Holdings, Inc., Newark, CA (US)

( * ) Notice: Subject to any disclaimer, the term of this patent is extended or adjusted under 35 U.S.C. 154(b) by 694 days.

(21) Appl. No.: 11/464,148

(22) Filed: Aug. 11, 2006

(65) Prior Publication Data

US 2007/0050528 A1    Mar. 1, 2007

Related U.S. Application Data

(60) Provisional application No. 60/707,681, filed on Aug. 12, 2005.

(51) Int. Cl.
G06F 1/00 (2006.01)
G06F 1/14 (2006.01)
G06F 1/12 (2006.01)

(52) U.S. Cl. .................. 713/500; 713/502; 713/600

(58) Field of Classification Search .............. 713/500
See application file for complete search history.

(56) References Cited

U.S. PATENT DOCUMENTS

| | | | |
|---|---|---|---|
| 6,789,182 B1* | 9/2004 | Brothers et al. | 712/30 |
| 7,266,714 B2* | 9/2007 | Davies et al. | 713/500 |
| 7,461,283 B2* | 12/2008 | Andrianov | 713/500 |
| 7,545,794 B2* | 6/2009 | Loukianov | 370/350 |
| 7,555,669 B2* | 6/2009 | Wong et al. | 713/600 |
| 2004/0044924 A1* | 3/2004 | Marik | 713/502 |

OTHER PUBLICATIONS

David Mosberger, et al. "IA-64 Linux® Kernel Design and Implementation" Hewlett-Packard Company, Prentice Hall PTR, Upper Saddle River, New Jersey 07458, pp. 356-361.

* cited by examiner

Primary Examiner—Suresh K Suryawanshi
(74) Attorney, Agent, or Firm—Sunstein Kann Murphy & Timbers LLP

(57) ABSTRACT

A scaling factor used in time interpolation calculations is tuned so as to compensate for clock sources that generate timer interrupts both slower and faster than expected. The scaling factor is decreased when the timer interrupts are late and the scaling factor is increased when the timer interrupts are early. By being able to account for timer interrupts that are generated too early, time skips are minimized. The adjusted scaling factor is used in calculating system time and interpolation offset values.

14 Claims, 6 Drawing Sheets

FIG. 3

TDU Memory 265

| Constants | Variables |
|---|---|
| tick_interval | xtime |
| offset_max | RTC_prior |
| skip_max | RTC_current |
| | scale |
| | offset |
| | skip_tot |
| | skip_cnt |
| | skip_avg |

SELF-TUNING TIME INTERPOLATOR

CROSS-REFERENCE TO RELATED APPLICATIONS

This application claims the benefit of U.S. provisional patent application Ser. No. 60/707,681, filed Aug. 12, 2005, which is herein incorporated by reference.

BACKGROUND OF THE INVENTION

1. Field of the Invention

The present invention relates generally to a time interpolation system and method and, more particularly, to a self-tuning time interpolation system and method.

2. Description of the Related Art

Computer operating systems employ timer interrupts as a way to track system time. In Linux operating systems, system time is incremented in intervals of around 1 millisecond (ms) by timer interrupts. The exact timing of when the timer interrupt is executed, however, may fluctuate due to interrupts being disabled or other hardware contingencies.

When interpolating the time in the time interval between two timer interrupts, these fluctuations need to be accounted for. Otherwise, time cannot be accurately determined. In the time interpolation method by David Mosberger, the difference between the actual time interval and the expected time interval is quantified and used as an offset that is to be applied in interpolating the time in a subsequent time interval. FIG. 1 illustrates this offset. The actual time interval is calculated with reference to the real-time clock (RTC) counter of the computer. In particular, it is calculated as the difference in the number of counts at the beginning and end of the time interval, multiplied by a scaling factor corresponding to the speed of the RTC. The expected time interval is typically 1 ms.

This offset is applied when determining the time in a subsequent time interval using the following formula:

Time=xtime at beginning of subsequent time interval+
(current RTC counter value−RTC counter value
at beginning of subsequent time interval)*scaling
factor+offset, where xtime is the absolute time measured in nanoseconds relative to Jan. 1, 1970, that is incremented by the expected time interval at every timer interrupt.

The offset value is updated at the end of each interval. It is increased in cases where the estimated timer interrupt occurs later than expected, and decreased in cases where the estimated timer interrupt occurs earlier than expected. When the offset value becomes less than zero, it cannot be used in any subsequent time calculation because it would result in a backwards movement of time and cause time to be passed again. As a result, it is set to zero, causing time to be skipped. For real-time applications, this is undesirable.

SUMMARY OF THE INVENTION

The present invention provides a time interpolator that tunes the scaling factor used in the time interpolation calculations so that it can compensate for clock sources that are both slower and faster than expected. In general, the scaling factor is decreased when the timer interrupts are late and the scaling factor is increased when the timer interrupts are early. With the ability to tune the scaling factor in this manner, time skips can be minimized.

The method according to an embodiment of the present invention includes the steps of calculating, after each interrupt, a difference value between a time interval between the current interrupt and the last interrupt based on a scaling factor and an expected time interval between the current interrupt and the last interrupt, adjusting the scaling factor up or down based on the calculated difference values, and determining the time based on the adjusted scaling factor.

The scaling factor adjustment may be carried out after each interrupt but to conserve system resources it is carried out on a periodic basis, e.g., every 1 minute. A downward adjustment is made if the sum total of the calculated difference values is a large positive value, e.g., greater than the expected time interval between interrupts. An upward adjustment is made if the any of the calculated difference values is a negative value and the average negative value is less than a predetermined number (or the absolute average value is greater than a predetermined maximum).

A computer system according to an embodiment of the present invention includes a first clock programmed to generate continuous interrupts separated by a predetermined time interval, a second clock operating at a speed that is higher than that of the first clock, and a time determining unit programmed to: (i) calculate an offset value each time the first clock generates an interrupt, (ii) adjust a scaling factor corresponding to the speed of the second clock up or down based on the calculated offset values, and (iii) calculate the time based on an absolute time value, the offset value and the adjusted scaling factor.

According to another aspect of the present invention, the time determining unit is programmed to store a running total of the offset values and adjust the scaling factor down if the running total is greater than a predetermined time value. On the other hand, if any of the offset values is a negative value and the average negative value is less than less than a predetermined number (or the absolute average value is greater than a predetermined maximum), the scaling factor is adjusted up.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a conceptual diagram of the memory structure of the memory used by a time determination unit shown in FIG. 2.

DETAILED DESCRIPTION

Figure 1:
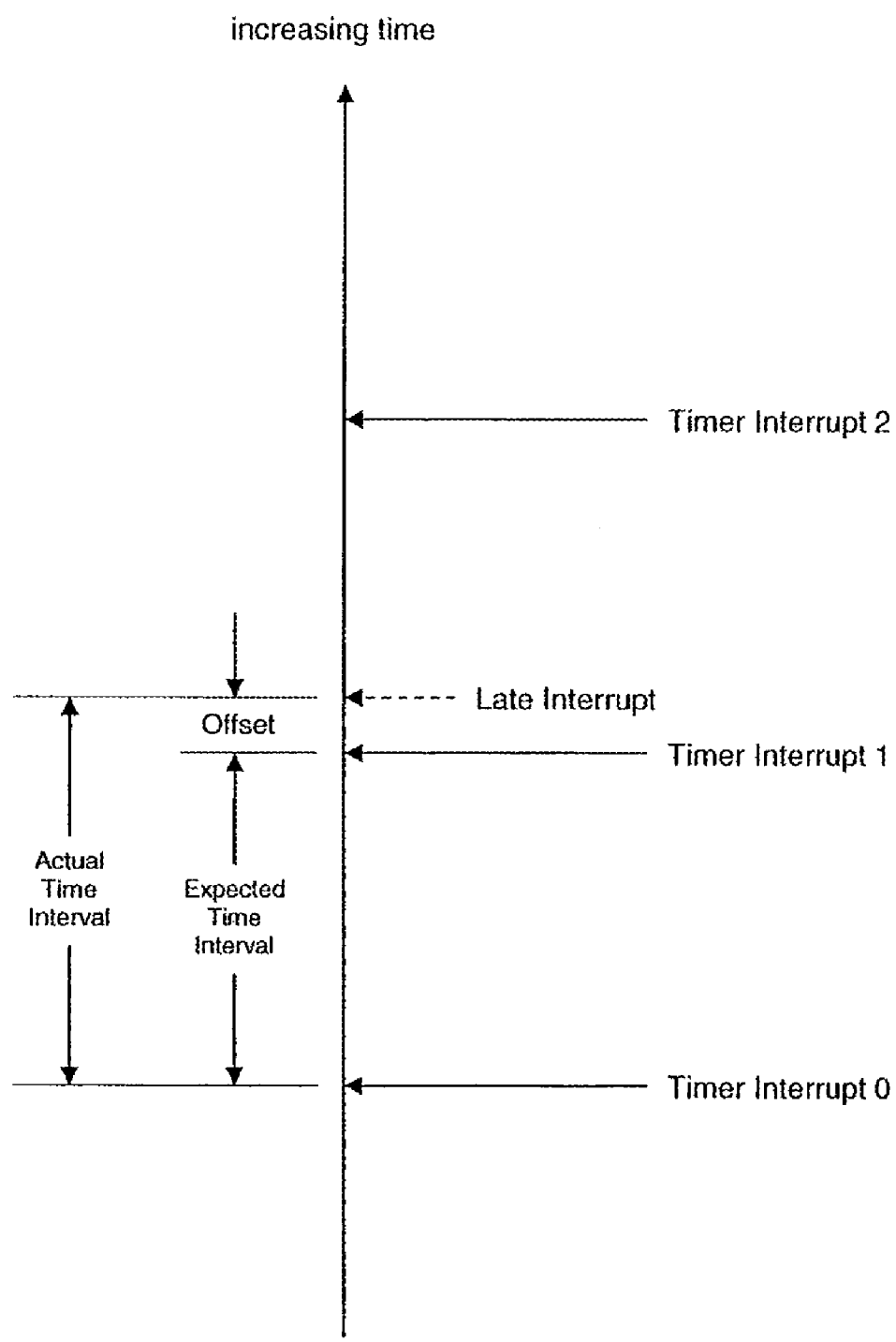
FIG. 1 provides an illustration of a late time interrupt relative to expected timer interrupts.
Figure 2:
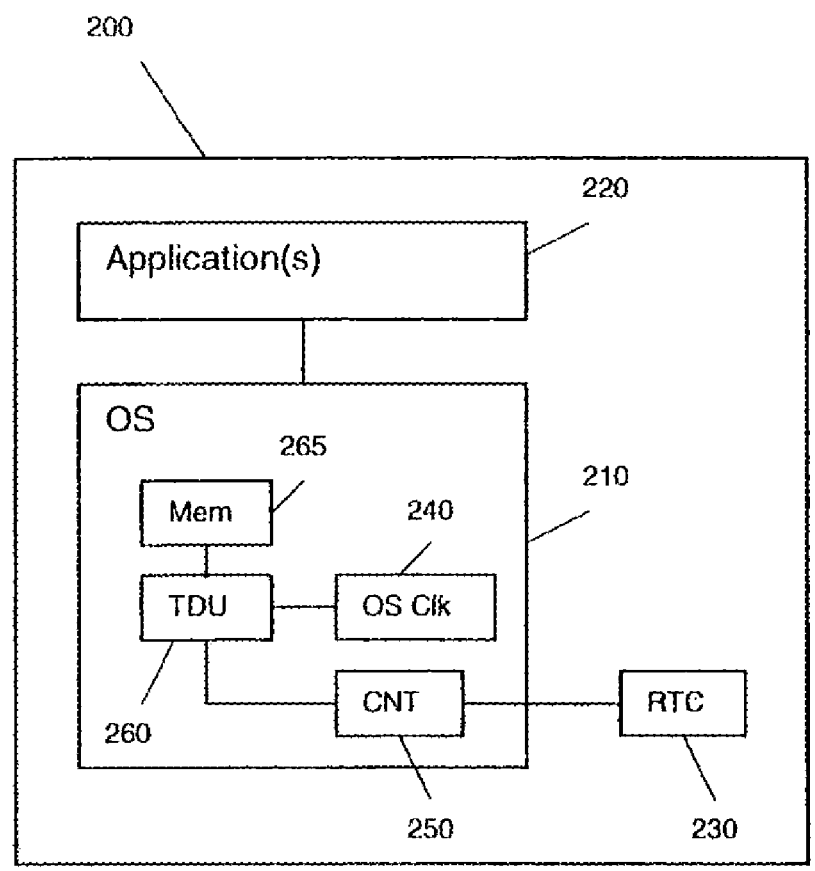
FIG. 2 illustrates a block diagram of a computer system that implements a time interpolator according to an embodiment of the present invention.

FIG. 2 illustrates a block diagram of a computer system 200 that implements a time interpolator according to an embodiment of the present invention. The computer system 200 includes an operating system (OS) 210 that manages allocation of the system resources (e.g., processor, memory, bus, etc.) for programs running on the computer system, such as application programs 220, and a high resolution real-time clock (RTC) 230 that provides resolution in the nanosecond range. The OS 210 includes the following functional units: an OS clock 240, an RTC counter 250, and a time determination unit (TDU) 260. A memory 265, depicted as part of the OS 210, represents the memory of the computer system 200 used by the TDU 260.

The OS clock 240 generates the timer interrupts at a predetermined time interval. In Linux operating systems, this predetermined time interval is set as 1 ms. The RTC counter 250 increments once per cycle of the RTC 230. The TDU 260 stores in the memory 265 the predetermined time interval of the timer interrupts as tick_interval, the current value of the RTC counter 250 as RTC_current, and the value of the RTC counter 250 at the last timer interrupt as RTC_prior. A conceptual diagram of the memory structure of the memory 265 showing these and other constants and variables used by the TDU 260 is illustrated in FIG. 3.

At each timer interrupt, the TDU 260 increments xtime, the absolute time measured in nanoseconds relative to Jan. 1, 1970, by the predetermined time interval stored in the memory 265 as the tick_interval (also quantified in nanoseconds). It also calculates an offset value associated with the difference between the actual time interval between the current interrupt and the last interrupt, which is equal to (RTC_current−RTC_prior)*scale, and an expected time interval between the current interrupt and the last interrupt, which is equal to tick_interval. The variable, scale, represents the scaling factor (in nanoseconds) that corresponds to the speed of the RTC 230. This calculated offset value is added to the offset value already stored in the memory 265. If the resulting sum is positive, it is stored the memory 265. If the resulting sum is negative, an offset value of 0 is stored in the memory, and also, the negative value is added to the skip_tot value stored in the memory 265 and the skip_cnt is incremented by one.

A negative offset value indicates that the timer interrupt has occurred early. It is set to zero because it cannot be used in any subsequent time calculation because it would result in a backwards movement of time and cause time to be passed again. Setting it to zero, however, causes time to be skipped. To correct for the time skipping, the TDU 260 keeps track of the number of times time skipping has occurred (skip_cnt) and the total amount of time that has been skipped (skip_tot). If it is determined that the average time skip is greater than a predetermined maximum skip value, the scaling factor is increased so as to reduce the number of subsequent time skips.

Figure 4:
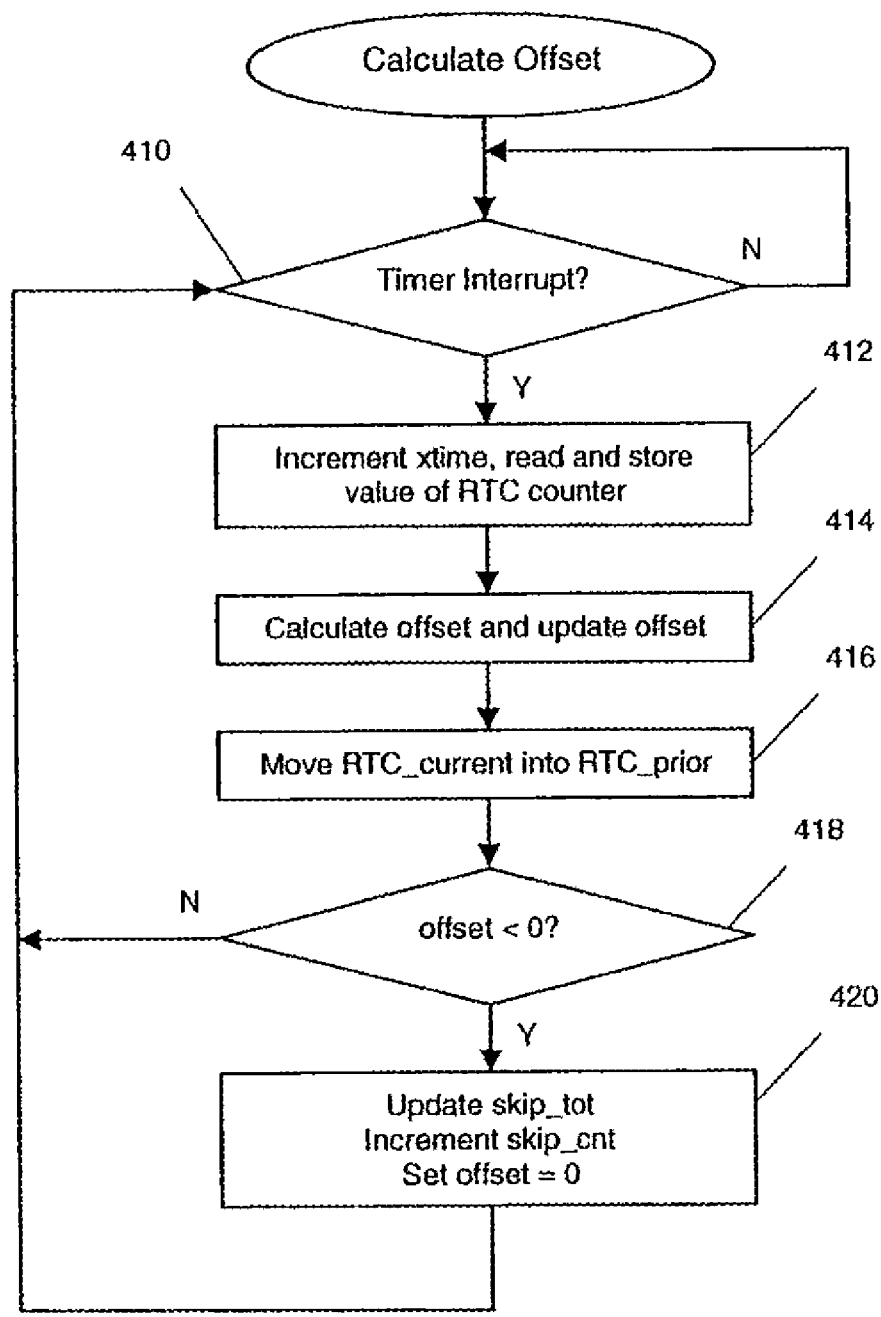
FIG. 4 is a flow diagram that illustrates the process steps carried out in connection with an offset calculation.

The flow diagram for the offset calculation is illustrated in FIG. 4. These steps are carried out by the TDU 260 of the OS 210. In Step 410, a check is made for a timer interrupt. Upon recognizing a timer interrupt, the TDU 260 increments the xtime by the tick_interval, reads the value of the RTC counter 250 and stores the value as RTC_current in the memory 265 (Step 412). Then, in Step 414, the offset value stored in the memory 265 is updated using the following formula: offset=offset+(RTC_current−RTC_prior)*scale−tick_interval. In Step 416, the value stored as RTC_current is moved into RTC_prior so that, at the next timer interrupt, the RTC counter value of the current timer interrupt can be correctly reflected in RTC_prior. In Step 418, a check is made to see if the updated offset value is less than 0. If it is not, flow returns to Step 410 where a check for the next timer interrupt is made.

If it is less than 0, Step 420 is carried out, at which the offset value is added to the skip_tot value stored in the memory 265; the skip_cnt variable is incremented by 1; and the offset variable is set to 0. The effect of setting the offset variable to 0 from a negative value is a time skip by the amount of the negative value. After Step 420, flow returns to Step 410.

Figure 5:
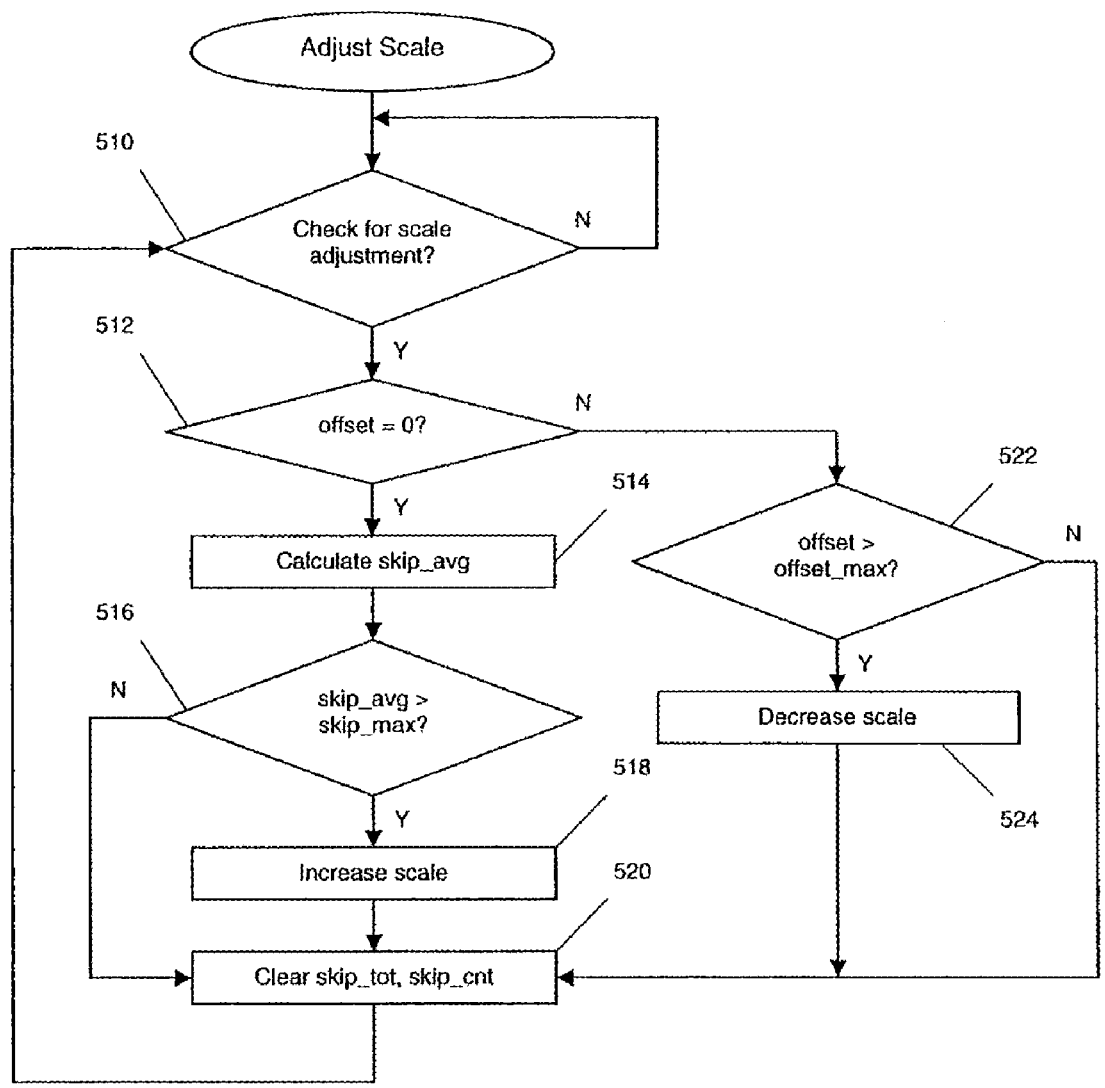
FIG. 5 is a flow diagram that illustrates the process steps carried out during a scaling factor adjustment.

In accordance with various embodiments of the present invention, the scaling factor that is used in subsequent offset and time calculations may be adjusted up or down. FIG. 5 is a flow diagram that illustrates the process steps carried out during a scaling factor adjustment. The scaling factor adjustment is carried out by the TDU 260 of the OS 210 at regular time intervals. A time interval of 1 minute is used in the embodiment illustrated herein.

In Step 510, a check is made to see sufficient time has passed since the last scaling factor adjustment. If it has, the offset value is checked for a 0 value (Step 512). An offset equal to 0 means that there may have been some time skips since the last scaling factor adjustment, and so, the average time skip value, skip_avg, is calculated in Step 514 using the formula: skip_avg=skip_tot/skip_cnt. If the average time skip is determined in Step 516 to be greater than a predetermined maximum skip value, skip_max, the scaling factor is increased in Step 518 and the values stored in skip_tot and skip_cnt are cleared in Step 520. Otherwise, the flow jumps to Step 520. After Step 520, the flow returns to Step 510.

If the offset value is not equal to zero, a check is made in Step 522 to see if it is greater than a predetermined maximum offset value, offset_max. In the embodiment illustrated herein, the predetermined maximum offset value is set to be the same as the expected time interval of the timer interrupts, namely 1 ms. If offset is greater than the predetermined maximum offset value, the scaling factor is decreased in Step 524 and the values stored in skip_tot and skip_cnt are cleared in Step 520. Otherwise, the flow jumps to Step 520. After Step 520, the flow returns to Step 510.

According to an embodiment of the invention, the scaling factor is increased or decreased in steps equal to $\frac{1}{2}^N$ ns, where N is the number of bits available to represent the decimal portion of the scaling factor. Where N=10, the scaling factor is increased or decreased in steps of $\frac{1}{2}^{10}$ ns or $\frac{1}{1024}$ ns.

Figure 6:
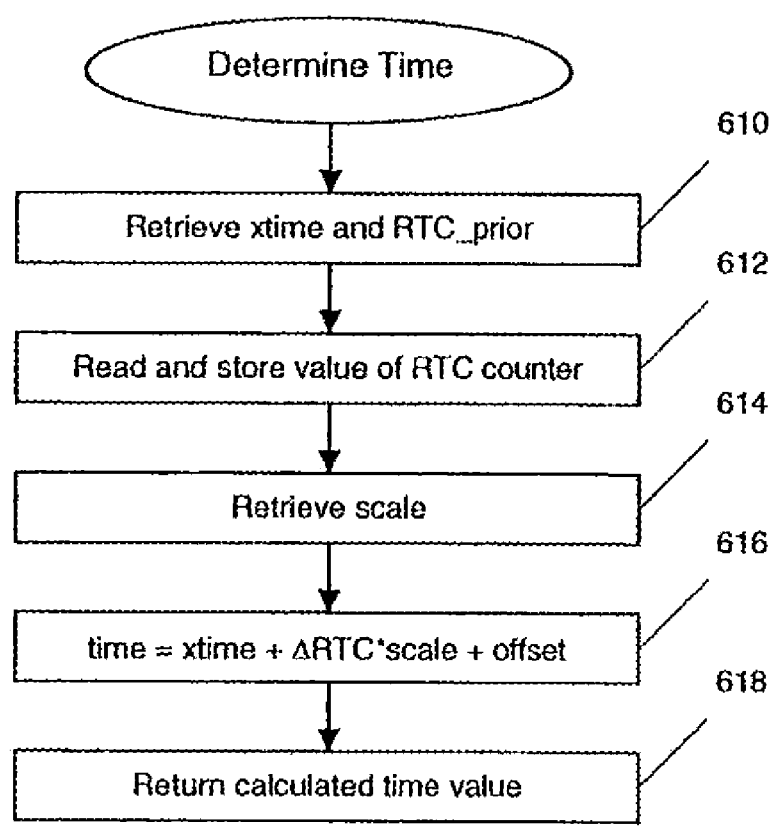
FIG. 6 is a flow diagram that illustrates the process steps carried out in connection with a time calculation.

The scaling factor as adjusted in accordance with the process steps illustrated in FIG. 5 and any offset are used to make time calculations. The flow diagram for the time calculation is illustrated in FIG. 6. These steps are carried out by the TDU 260 of the OS 210. In Step 610, the xtime and RTC_prior values stored in the memory 265 are retrieved. Then, in Step 620, the TDU 260 reads the value of the RTC counter 250 and stores the value as RTC_current in the memory 265. The scaling factor as adjusted in accordance with the process steps illustrated in FIG. 5 is retrieved in Step 614. Then, the time calculation is made in Step 616 using the formula: time=xtime+(RTC_current−RTC_prior)*scale+offset. In Step 618, the calculated time value is returned.

The frequency of scaling factor tuning and the scaling factor tuning increments should be selected to provide a stable and continually flowing time source. Although one object in making the selection is to ensure that the number of time skips is reduced and minimized, it is not desirable to eliminate the time skips altogether. A periodic, preferably not too frequent, occurrence of the time skips would cause the system time to be synchronized to xtime at that time. According to various embodiments of the present invention described above, the ability to tune in $\frac{1}{2}^{10}$ nanosecond increments helps by increasing the possible accuracy of the scaling factor. The scaling factor tuning itself is run once a minute or so and introduces a minuscule change of $\frac{1}{2}^{10}$ nanoseconds (if necessary) in order to ensure that the speed with which time passed does not change significantly in a short time frame. If there is a need for larger tuning increments, e.g., at computer system bootup or due to external synchronization, then the self-tuning may take place over longer timer periods. For example, it may adjust the scaling factor by $60*1/1024$ nanosecond increments per hour.

Appendices A and B containing source code instructions for a process by which embodiments of the present invention are practiced in a computer system are being submitted herewith.

While particular embodiments according to the invention have been illustrated and described above, those skilled in the art understand that the invention can take a variety of forms and embodiments within the scope of the appended claims.

What is claimed is:

1. A computer-implemented method of determining time by and in a computer system having a system clock configured to continually generate interrupts separated by a predetermined time interval, and a high-resolution clock operating at a speed that is higher than that of the system clock, the method comprising:
   after each interrupt generated by the system clock, calculating a difference value between the predetermined time interval and an amount of time elapsed since a prior interrupt until said interrupt, wherein said amount of time elapsed is proportional to an adjustable scaling factor corresponding to an estimated speed of the high-resolution clock;
   adjusting said scaling factor up or down to improve the estimate of the speed of the high-resolution clock; and
   determining the time based on the adjusted scaling factor.

2. The method according to claim 1, farther comprising the steps of:
   storing a running total of the difference values; and
   if the running total is greater than a predetermined time value, adjusting said scaling factor down.

3. The method according to claim 2, wherein the predetermined time value is equal to the predetermined time interval.

4. The method according to claim 1, farther comprising the steps of:
   storing a running total of the difference values;
   determining if the running total is less than zero; and
   if the running total is less than zero, incrementing a skip counter, adding the value of the running total to a skip variable, and setting the running total to a zero value.

5. The method according to claim 4, farther comprising the steps of:
   determining an average absolute value of the running total values added to the skip variable; and
   comparing the average absolute value with a predetermined time value, and adjusting said scaling factor up based on the comparison.

6. The method according to claim 5, wherein the scaling factor is adjusted up if the average absolute value is greater than the predetermined time value.

7. The method according to claim 5, further comprising the step of clearing the skip counter and the skip variable after the scaling factor is adjusted up.

8. The method according to claim 1, farther comprising the steps of:
   storing a running total of the difference values; and
   maintaining a counter for the high-resolution clock, wherein the time is calculated based on a time at a prior interrupt generated by the system clock, an amount of increase in the counter value since the prior interrupt multiplied by the adjusted scaling factor, and the running total of the difference values.

9. A computer system comprising:
   a system clock programmed to generate continuous interrupts separated by a predetermined time interval;
   a high-resolution clock operating at a speed that is higher than that of the system clock; and
   a time determining unit programmed to:
      (i) calculate an offset value each time the system clock generates an interrupt,
      (ii) adjust a scaling factor corresponding to the speed of the high-resolution clock up or down, and
      (iii) calculate the time based on an absolute time value, said offset value, and the adjusted scaling factor.

10. The computer system according to claim 9, wherein the time determining unit is programmed to store a running total of the offset values, and adjust said scaling factor down if the running total is greater than a predetermined time value.

11. The computer system according to claim 10, wherein the predetermined time value is equal to the predetermined time interval.

12. The computer system according to claim 9, wherein the time determining unit is programmed to store a running total of the offset values, determine if the running total is less than zero, and set the running total to a zero value if the running total is less than zero.

13. The computer system according to claim 12, wherein the time determining unit is programmed to calculate an average absolute value of the running totals that have been set to zero since the last scaling factor adjustment, compare the average absolute value with a predetermined time value, and adjust said scaling factor up if the average absolute value is greater than the predetermined time value.

14. The computer system according to claim 9, wherein the time determining unit is programmed to store a running total of the offset values and maintain a counter for the second clock, and wherein the time is calculated based on said time value, amount of increase in the counter value since the prior interrupt multiplied by the adjusted scaling factor and the running total of the offset values.

* * * * *